United States Patent [19]

Yoshitsugu

[11] Patent Number: 4,708,367
[45] Date of Patent: Nov. 24, 1987

[54] SEATBELT ASSEMBLY
[75] Inventor: Noritada Yoshitsugu, Aichi, Japan
[73] Assignee: Toyota Jidosha Kabushiki Kaisha, Japan
[21] Appl. No.: 882,463
[22] Filed: Jul. 7, 1986
[30] Foreign Application Priority Data
  Jul. 12, 1985 [JP] Japan .................. 60-107203[U]
[51] Int. Cl.⁴ ............................................ B60R 21/02
[52] U.S. Cl. .................................. 280/804; 297/469;
                                              297/483; 280/808
[58] Field of Search ............... 280/801, 802, 804, 808;
                                              297/469, 483

[56] References Cited
U.S. PATENT DOCUMENTS

| 4,039,224 | 8/1977 | Bauer et al. | 280/804 |
| 4,281,853 | 8/1981 | LeVeux | 280/804 |
| 4,343,489 | 8/1982 | Suzuki et al. | 280/804 |
| 4,394,036 | 7/1983 | Hildebrandt | 280/804 |
| 4,456,283 | 6/1984 | Michael et al. | 280/804 |
| 4,597,588 | 7/1986 | Kawai | 280/804 |

FOREIGN PATENT DOCUMENTS 59-110495  7/1984  Japan .

Primary Examiner—John J. Love
Assistant Examiner—Ken Rile
Attorney, Agent, or Firm—Parkhurst & Oliff

[57] ABSTRACT

This invention relates to an automatically fastening seatbelt assembly which causes an occupant of a vehicle to be automatically held to a seat in the vehicle by a restraining webbing, after the occupant is positioned on the seat in the vehicle.

The seatbelt assembly includes a guide rail, a slider and adjustment device. The guide rail includes a longitudinal groove therein, and the guide rail is mounted on a vehicle body. The slider is displaceable along the longitudinal groove of the guide rail and a restraining webbing is fastened at one end thereof to the slider. The adjustment device includes a stop member and the adjustment device is slidably mounted on the guide rail. The stop member is displaceable with the adjustment device along the guide rail and the adjustment means is adapted to be selectively position and locked at one of a plurality of anchor positions. The stop member crosses a path of the slider along the guide rail. The slider is displaceable along the guide rail between a front end of the guide rail and the stop member. Accordingly, when the adjustment device is positioned at one of the plurality of anchor position the stop member prevents the slider from being displaced over the stop member.

20 Claims, 17 Drawing Figures

SEATBELT ASSEMBLY

BACKGROUND OF THE INVENTION

The present invention relates to an automatically fastening seatbelt assembly which causes an occupant of a vehicle to be automatically held to a seat in the vehicle by a restraining webbing, after the occupant is positioned on the seat in the vehicle.

U.S. Pat. No. 4,343,489 discloses a seatbelt assembly which includes a guide rail, a slider which is displaceable along the guide rail and a restraining webbing which is fixed to the slider at one end thereof. The guide rail includes a longitudinal guide groove therein and the guide rail is fixed on a roof side member of a vehicle. The slider is received in the guide groove and is displaceable along the guide rail. The guide rail is provided with a forward stop switch provided at a forward portion of the guide rail and rearward stop switch provided at a rearward portion of the guide rail. The forward and rearward stop switches are connected to a source of electricity or an electric control circuit by connecting wires. Accordingly, the stop switches detect the arrival of the slider at either end of the guide rail and output signals to the electric control circuit.

Further, the guide rail includes an anchor pin which is secured to a rear bottom end of the guide rail. When the slider, which is connected to one end of the restraining webbing through an anchor plate, is positioned at the rear bottom end of the guide rail the anchor pin prevents the slider from being removed from the guide rail.

Accordingly, when the slider is positioned at an adequate anchor position, the occupant is securely held to the seat in the vehicle by the restraining webbing.

However, an adequate anchor position of the slider depends on the size of the occupant. That is when a vehicle occupant is short an adequate anchor position of the slider may be lower than the adequate anchor position of the slider for a tall occupant. However, the anchor pin of the slider in the known art cannot be adjusted upwardly or downwardly along the guide rail.

SUMMARY OF THE INVENTION

The present invention has been developed in view of the foregoing background and to overcome the foregoing drawbacks. It is accordingly an object of this invention to provide a seatbelt assembly which can adjust an anchor position of a slider in accordance with the size of an occupant.

To adjust the anchor position of the slider, the seatbelt assembly includes a guide rail, a slider and an adjustment means.

The guide rail includes a longitudinal groove therein, and the guide rail is mounted on a vehicle body.

The slider is displaceable along the longitudinal groove of the guide rail and a restraining webbing is fastened at one end thereof to the slider.

The adjustment means includes a stop member, and the adjustment means is slidably mounted on the guide rail. The stop member is displaceable with the adjustment means along the guide rail. The adjustment means is selectively positioned and locked at one of a plurality of anchor positions. The stop member crosses a passage of the slider along the guide rail. The slider is displaceable along the guide rail between a front end of the guide rail and the stop member. Accordingly, when the adjustment means is positioned at one of the plurality of anchor positions, the stop member of the adjustment member prevents the slider from being displaced past the stop member.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements and wherein.

DETAILED DESCRIPTION OF THE PREFERRED EMBODIMENTS

The present invention will be described in detail with reference to the accompanying drawings, which illustrate different embodiments according to the present invention.

Figure 1:
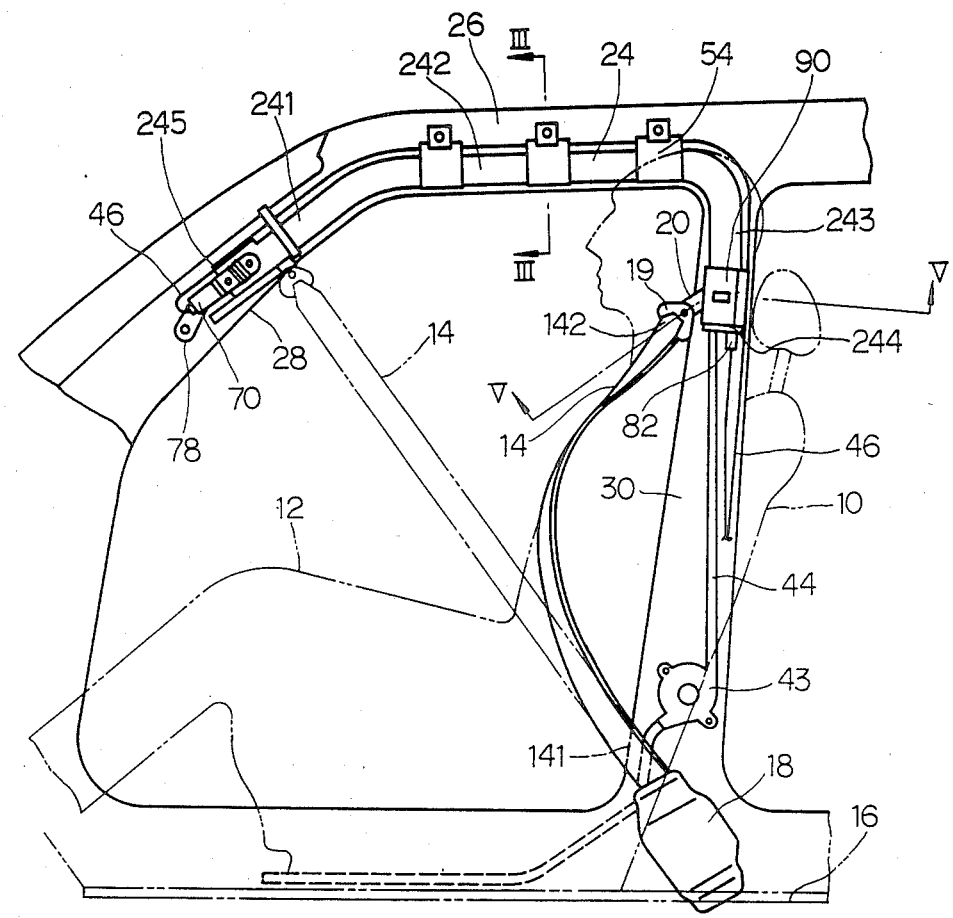
FIG. 1 is a side view of a seatbelt system according to the present invention installed on a passenger side of a vehicle, as viewed from the driver side of the vehicle.

Referring to FIG. 1 a restraining webbing 14 extends and surrounds a body of an occupant 12, when the occupant is positioned on a seat 10 and a vehicle door (not shown in drawings) is closed. When the vehicle door is opened, the location of the restaining webbing 14 is represented by the broken line. A retractor 18 winds a portion 141 of the webbing 14 therein. The retractor 18 is secured to a floor member 16 of a vehicle and located at a substantially central portion in the lateral direction of the vehicle. The retractor 18 utilizes a locking mechanism (not shown in drawings) which prevents an abrupt windoff of the webbing 14 in an emergency situation.

An outer portion 142 of the webbing 14 is connected to a slider 20 by an anchor plate 19. The slider 20 is located within a guide groove 32 defined within a guide rail 24. The guide rail 24 is fixed on a front pillar 28, a roof side member 26 and a center pillar 30 of the vehicle. A slanted front portion 241 of the guide rail 24 is secured to the front pillar 28 by a forward anchor bracket 78. A horizontal central portion 242 of the guide rail 24 is secured to the roof side member 26 by a plurality of hangers 54. A vertical rear portion 243 of the guide rail 24 is secured to the center pillar 30. The guide groove 32 extends in a longitudinal direction along the guide rail 24, and the slider 20 is longitudinally displaceable along the guide groove 32.

A forward stop switch 70 is located on the front end 245 of the guide rail 24. The forward end 245 of the guide rail 24 and the forward stop switch 70 are fixed to the vehicle body by the forward anchor bracket 78. A rearward stop switch 82 is located on the rearward end 244 of the guide rail 24.

The forward stop switch 70 and the rearward stop switch 82 are connected to a source of electricity (not shown in the drawings) or an electric control circuit (not shown in the drawings) by at least one connecting wire 46.

Figure 2:
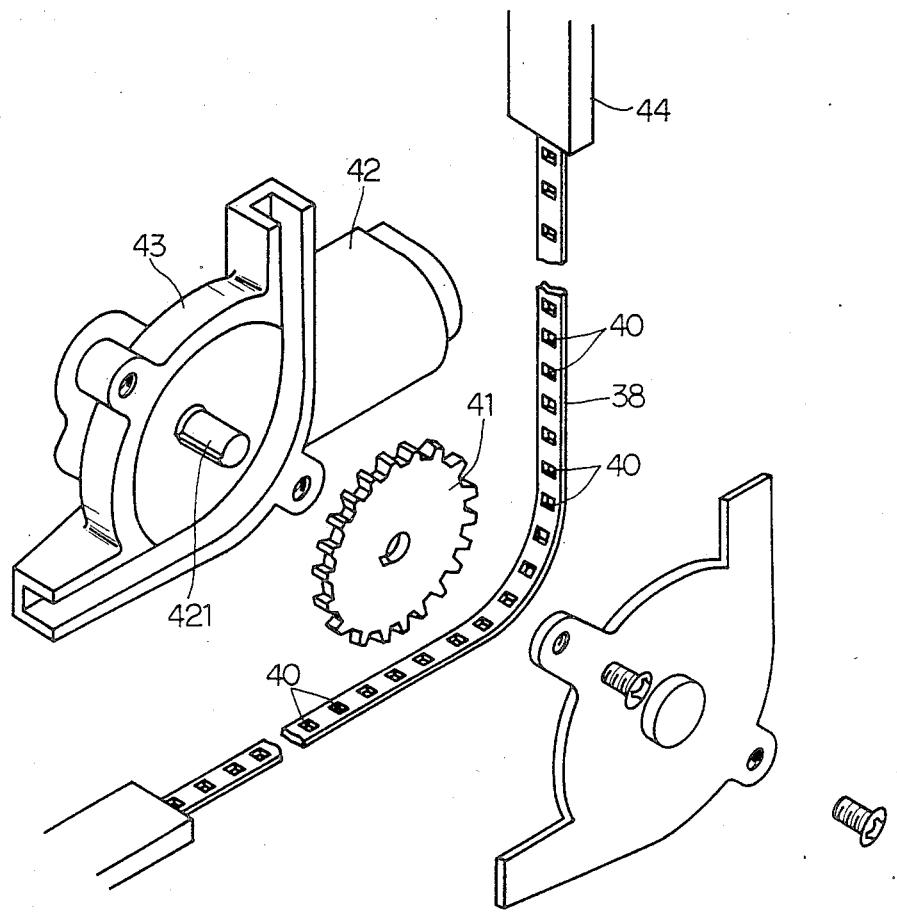
FIG. 2 is an enlarged perspective view showing components of a driving means in a disassembled condition for driving a tape which is connected to a slider at an end thereof.

Furthermore, the rearward end 244 of the guide rail 24 is connected to a tape track 44, which includes a tape groove therein (not shown in the drawings). This tape groove communicates with a tape groove 36 of the guide rail 24. A lower end of the tape track 44 is in contact with a sprocket housing 43 which is secured to a lower portion of the center pillar 30. As shown in FIG. 2, rectangular openings 40 in the driving tape 38 mesh with a sprocket wheel 41, which is pivotally supported in the sprocket housing 48. The sprocket wheel 41 is adapted to be rotated by an output shaft 421 of a motor 42, and when the sprocket wheel 41 rotates, it drives the driving tape 38 such that it moves along the tape track 44 and the guide rail 24. The movement of the driving tape 38 causes the slider 20 to move between the forward and rearward ends 245 and 244 of the guide rail 24.

The motor 42 displaces the driving tape 38 whenever an occupant enters or prepares to exit the vehicle. For example, when the occupant sits on seat 10 of the vehicle and closes the door, the sprocket wheel 41 turns in a clockwise direction (as shown in FIG. 2), whereby the slider 20 is displaced from the forward end 245 of the guide rail 24 toward the rear end 244. The slider 20 stops when the head portion 34 of the slider 20 reaches an actuator 701 of the rear stop switch 82. Conversely, when an occupant opens the door, the sprocket wheel 41 turns in a counter-clockwise direction, whereby the slider 20 is displaced from the rear end 244 of the guide rail 24 toward the forwrd end 245.

For a detailed discussion of the operation of the automatic seatbelt assembly, see U.S. Pat. No. 4,343,489, which is herein incorporated by reference.

Figure 3:
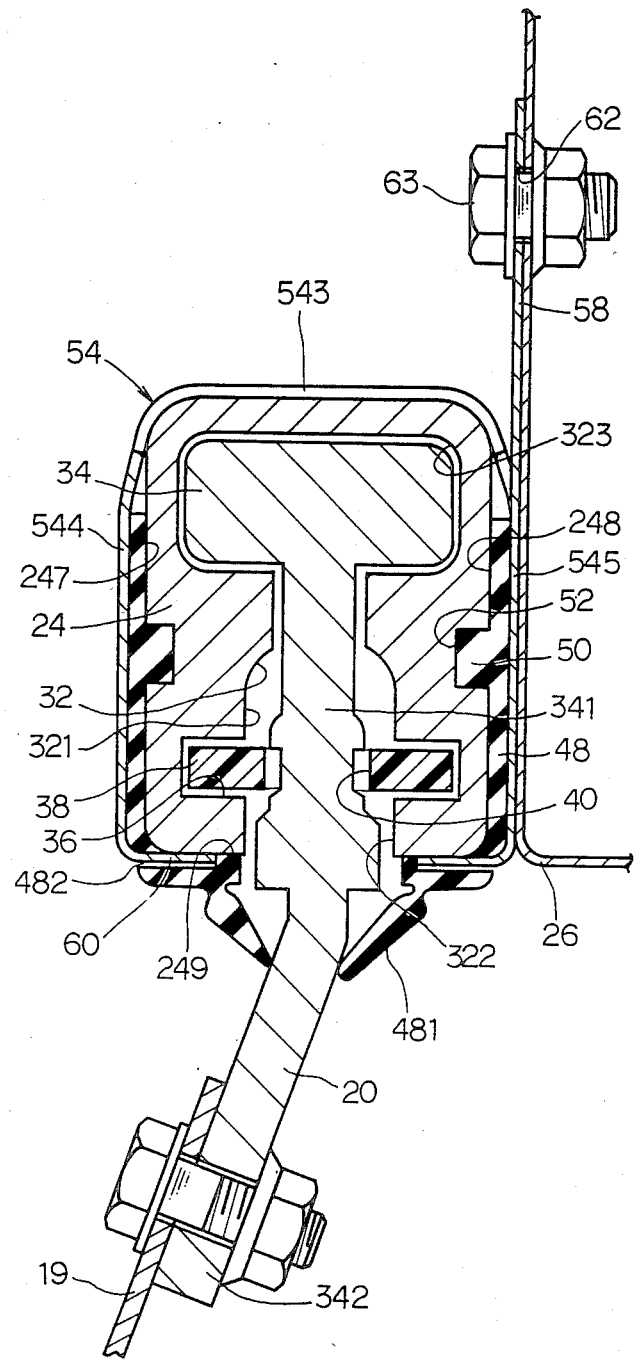
FIG. 3 is an enlarged cross-sectional view taken along the line III—III in FIG. 1, wherein the slider is disposed on the line III—III in FIG. 1.

As shown in FIG. 3, the slider 20 includes a head portion 34 and a body portion 341, such that the slider 20 is substantially T-shaped in cross-section. The body portion 341 includes a leg portion 342 at a lower end thereof. The head portion 34 is slidably received in a head groove 323 of the guide rail 24. The body portion 341 is inserted into an installing hole 40 which is defined within the driving tape 38. The body portion 341 is displaceable within a guiding slit 322 which extends along the longitudinal direction of the guide rail 24. The driving tape 38 is displaceable within the tape groove 36, and the driving tape 38 perpendicularly intersects an intermediate portion 321 of the guide groove 32. The tape groove 36 also extends along the longitudinal direction of the guide rail 24. More specifically, the driving tape 38 is displaceable along the tape groove 36 such that the slider 20 can move between the forward end or portion 245 and the rearward end or portion 244 of the guide rail 24.

The anchor plate 19 is rotatably connected to a lower end of the leg portion 342 of the slider 20 by a bolt and a nut assembly.

The guide rail 24 includes mounting grooves 52 which are longitudinally provided along the guide rail 24. The mounting grooves 52 can be continuously or intermittently formed in both side surfaces 247 and 248 of the guide rail 24. A cover 48 is provided with lip 481 which conceals the guiding slit 322 of the guide groove 32 to improve the aesthetic appearance of the seatbelt assembly. Further, projection 50 of the cover 48 is received and held within the mounting groove 52 of the guide rail 24.

Figure 4:
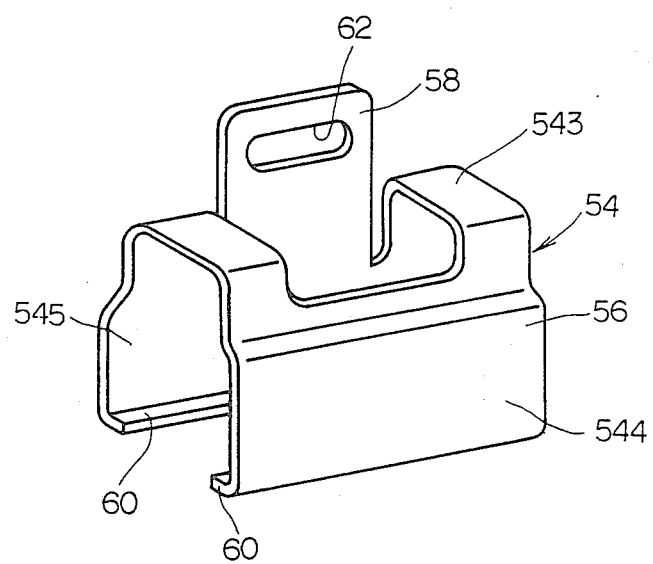
FIG. 4 is an enlarged perspective view showing a fastening means for fastening a guide rail to a vehicle body.

As shown in FIG. 4, the hanger 54 includes a holding portion 56 and a mounting flange 58. The holding portion 56 holds or supports the guide rail 24. The holding portion 56 includes a top horizontal plate 543, an inner vertical plate 544 and an outer vertical plate 545. The inner vertical plate 544 extends downwardly from an inner edge of the top horizontal plate 543, while the outer vertical plate 545 extends downwardly from an outer edge of the top horizontal plate 543. The vertical plates 544 and 545 are laterally spaced. Further, two bent portions 60 extend horizontally toward each other from lower ends of each vertical plate 544 and 545. As shown in FIG. 3, the bent portions 60 are inserted into apertures 482 of the covers 48. The bent portions 60 are in contact with the bottom surface 249 of the guide rail 24. The covers 48 are positioned between the first side surface 247 of the guide rail 24 and the inner vertical plate 544 of the hanger 54, and between the second side surface 248 of the guide rail 24 and the outer vertical plate 545 of the hanger 54. The mounting flange 58 upwardly extends from the outer vertical plate 545. The mounting flange 58 is provided with a hole 62 for inserting a mounting bolt 63 therethrough. The plurality of hangers 54 are secured to the roof side member 26 by the bolt-nut assemblies 63.

As shown in FIG. 5 through FIG. 8, the rearward end 244 of the guide rail 24 is fixed to the center pillar 30 of the vehicle body by first and second rearward anchor brackets 84 and 840. The center pillar 30 includes an inner plate 301 and an outer plate 302. The first rearward anchor bracket 84 includes a plurality of first holes 845, a plurality of second holes 846 and a bent portion 847. The bent portion 847 extends perpendicularly from the first rearward anchor bracket 84 and is inserted into the aperture 482 of the cover 48. The bent portion 847 is in contact with the bottom surface 249 of the guide rail 24. The cover 48 is positioned between the inner surface 247 of the guide rail 24 and the first rearward anchor bracket 84. The cover 48 includes a plurality of holes 483, each of which is the same size as each of the second holes 846 of the first rearward anchor bracket 84. Each hole 483 is coaxial with each second hole 846. The plurality of second holes 846 are aligned in the longitudinal direction of the rearward anchor bracket 84. The rear end 244 of the guide rail 24 includes a plurality of first openings 974, a pair of second openings 971 and 972 and a plurality of recesses 975. The plurality of first openings 974 are in alignment in the longitudianl direction of the guide rail 24. Each the first opening 974 is coaxial with each of the holes 483 of the cover 48, each of the second holes 846, and each of the recesses 975. Each of the first openings 974 is the same size as each of the holes 483, each of the second holes 846 and each the recess 975. Each recess 975 is defined within the guide rail 24 and each recess 245 corresponds to one of the first openings 244.

Accordingly, the guide groove 32 communicates with the outside of the first rearward anchor bracket 84 through the first opening 974, the hole 483 and the second hole 846.

The plurality of first openings 974, the plurality of recesses 975 and the pair of second openings 971 and 972 are defined between the tape groove 36 and the head groove 323 of the guide groove 32 so as not to prevent the driving tape 38 and the rearward stop switch 82 from being displaced respectively within the tape groove 36 and the head groove 323.

The pair of second openings 971 and 972 are defined in the vicinity of the rear bottom end 244 of the guide rail 24 and the plurality of first openings 974 and the plurality of recesses 975 are defined apart from the rear bottom end 244 of the guide rail 24.

The other cover 48 is positioned between the outer side surface 248 of the guide rail 24 and the second rearward anchor bracket 840. The second rearward anchor bracket 840 includes a plurality of first holes 845 and a bent portion 847. The bent portion 847 extends perpendicularly from the second rearward anchor bracket 840 and is inserted into the aperture 482 of the cover 48. The bent portion 847 is in contact with the bottom surface 249 of the guide rail 24. Each first hole 845 of the first rearward anchor bracket 84 corresponds to and is coaxial with each first hole 845 of the second rearward anchor bracket 840. A cylinder 842 is located between the first and second rearward anchor brackets 84 and 840 and a spacer 843 is located between the second rearward anchor bracket 840 and the inner plate 301 of the center pillar 30.

A bolt 841 is inserted in the first holes 845 of the first and second rearward anchor brackets 84 and 840, the cylinder 842 and the spacer 843 and the bolt 841 is secured to the inner plate 301 by a nut 844.

The cylinder 842 maintains a distance defined between the first and second rearward anchor brackets 84 and 840 and the spacer 843 maintains an interval defined between the second rearward anchor bracket 840 and the inner plate 301 of the center pillar 30. The distance is slightly greater than a width of the guide rail 24.

Accordingly, the guide rail 24 is securely mounted on the center pillar 30 and the interval is defined by the spacer 843.

An adjustment device 90 includes a cylinder portion 901, a pair of bent portions 903, an elongated opening 904, a stop bar 930 and a bracket 91. The adjustment device 90 is slidably mounted on the first and second rearward anchor brackets 84 and 840. The pair of bent portions 903 are slidably mounted on the pair of bent portions 847 of the first and second rearward anchor brackets 84 and 840. The pair of bent portions 903 are not in contact with the covers 48. An outer plate of the adjustment device 90 is located within the interval defined between the second rearward anchor bracket 840 and the inner plate 301 of the center pillar 30, and the thickness of the outer plate of the adjustment device 90 is less than the interval. The spacer 843 is located within the elongated opening 904, so that the bolt 841 does not prevent the adjustment device 90 from sliding on the first and second rearward anchor brackets 84 and 804 along the guide rail 24, but so the elongated opening 904 limits the movement of the adjustment device 90. Therefore, even if the adjustment device 90 does not have any specific locking mechanism the adjustment device 90 is prevented from dropping down from the guide rail 24. The cylinder portion 901 extends from an inner plate of the adjustment device 90 to an interior of the vehicle and an opening 902 is defined within an inner end of the cylinder portion 901.

Figure 5:
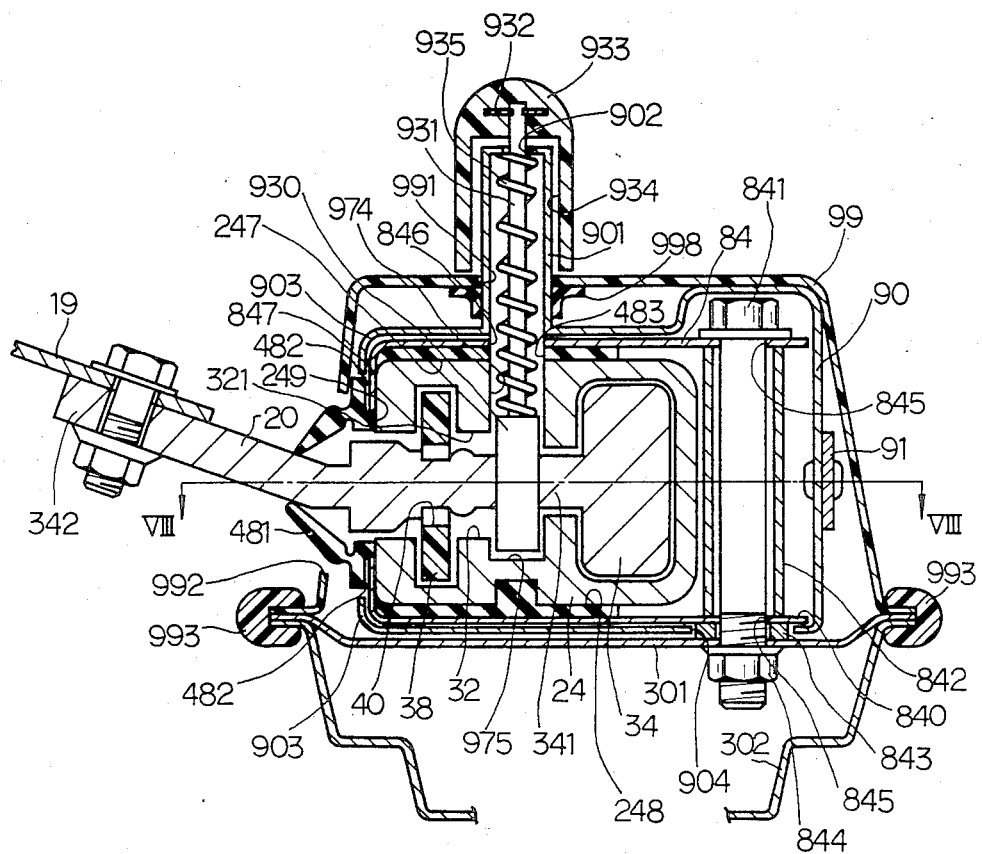
FIG. 5 is an enlarged cross-sectional view taken along the line V—V in FIG. 1, wherein a stop means is positioned at an engagement position.

A connecting rod 931 is connected to a knob 933 by a washer 932 and the connecting rod 931 is inserted into the opening 902 of the cylinder portion 901. Further, the connecting rod 931 is inserted into a spring 935 and an another end of the connecting rod 931 is secured to the stop bar 930. A recess 934 is defined with the knob 933 and the cylinder portion 901 is inserted into the recess 934 of the knob 933 when the stop bar 930 is biased by the spring 935, as shown in FIG. 5. The stop bar 930 is displaceable in the lateral direction of the guide rail 24. When the spring 935 biases the stop bar 930 the stop bar 930 crosses the guide groove 32 and is located in the recess 975 and the first opening 974 of the guide rail 24.

Figure 8:
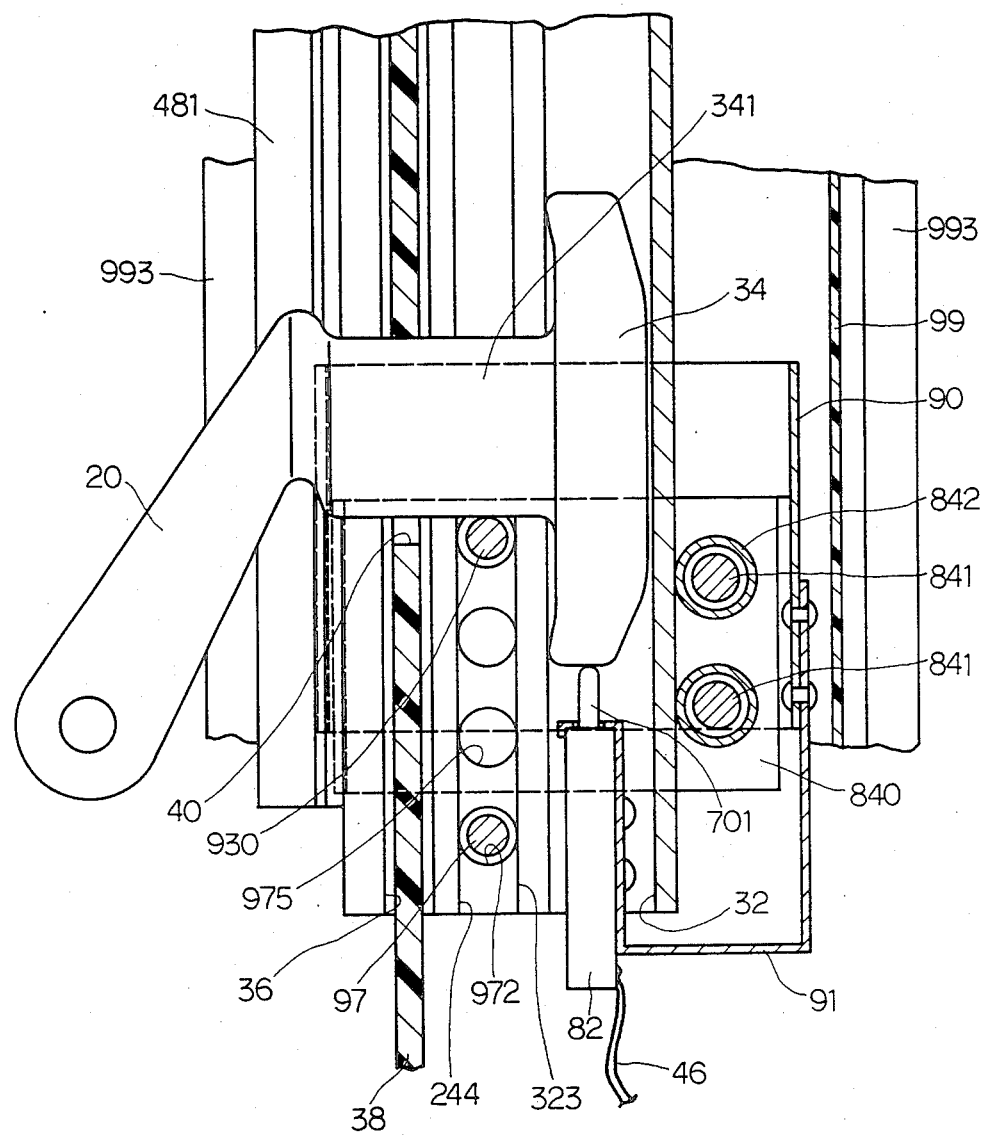
FIG. 8 is a cross-sectional view taken along the line VIII—VIII in FIG. 5, wherein the slider is in contact with the stop means.
Figure 9:
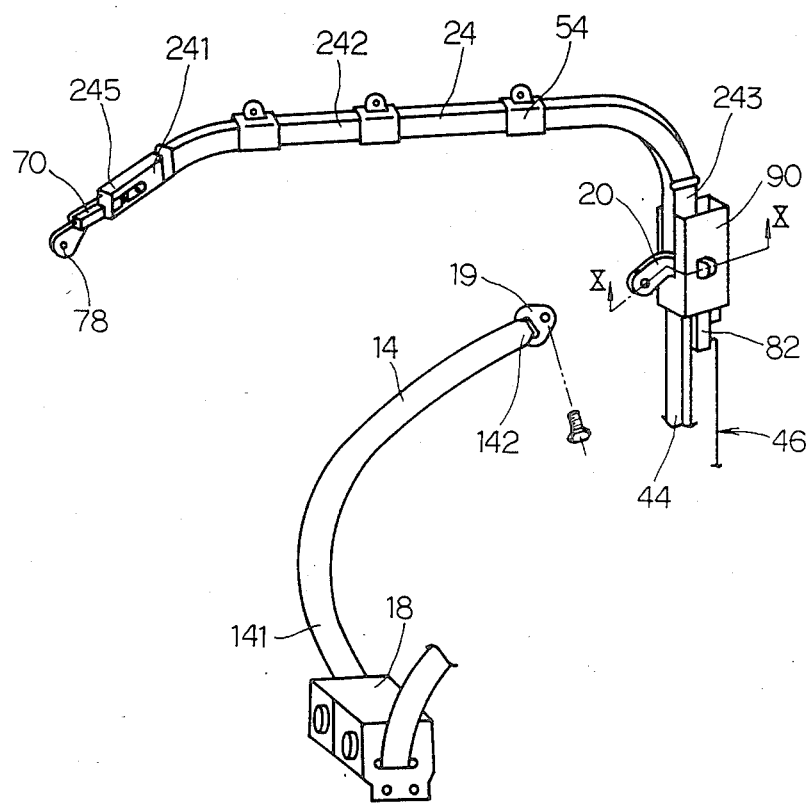
FIG. 9 is a perspective view of a second embodiment of the present invention.

Accordingly, as shown in FIG. 8, the slider 20 is prevented from moving downwardly along the guide groove 32 by the stop bar 930. When the body portion 341 of the slider 20 is in contact with the stop bar 930 an end of the head portion 34 of the slider 20 is in contact with the actuator 701 of the rearward stop switch 82.

The rearward stop switch 82 is secured to the bracket 91 which is further secured to the adjustment device 90, and the rearward stop switch 82 is located within the guide groove 32. When the head portion 34 of the slider 20 contacts the actuator 701, the slider 20 will not be displaced any further.

Figure 6:
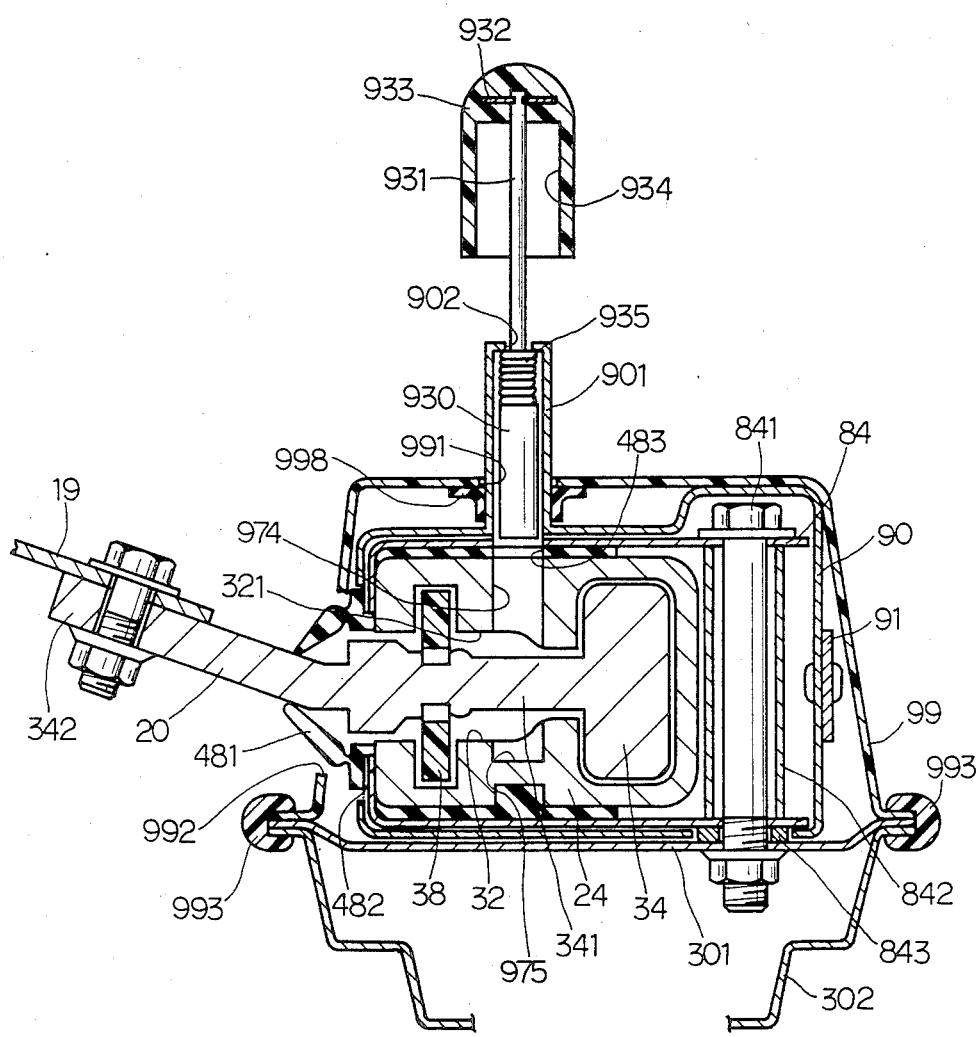
FIG. 6 is an enlarged cross-sectional view taken along the line V—V in FIG. 1, wherein the stop means is positioned at a disengagement position.
Figure 7:
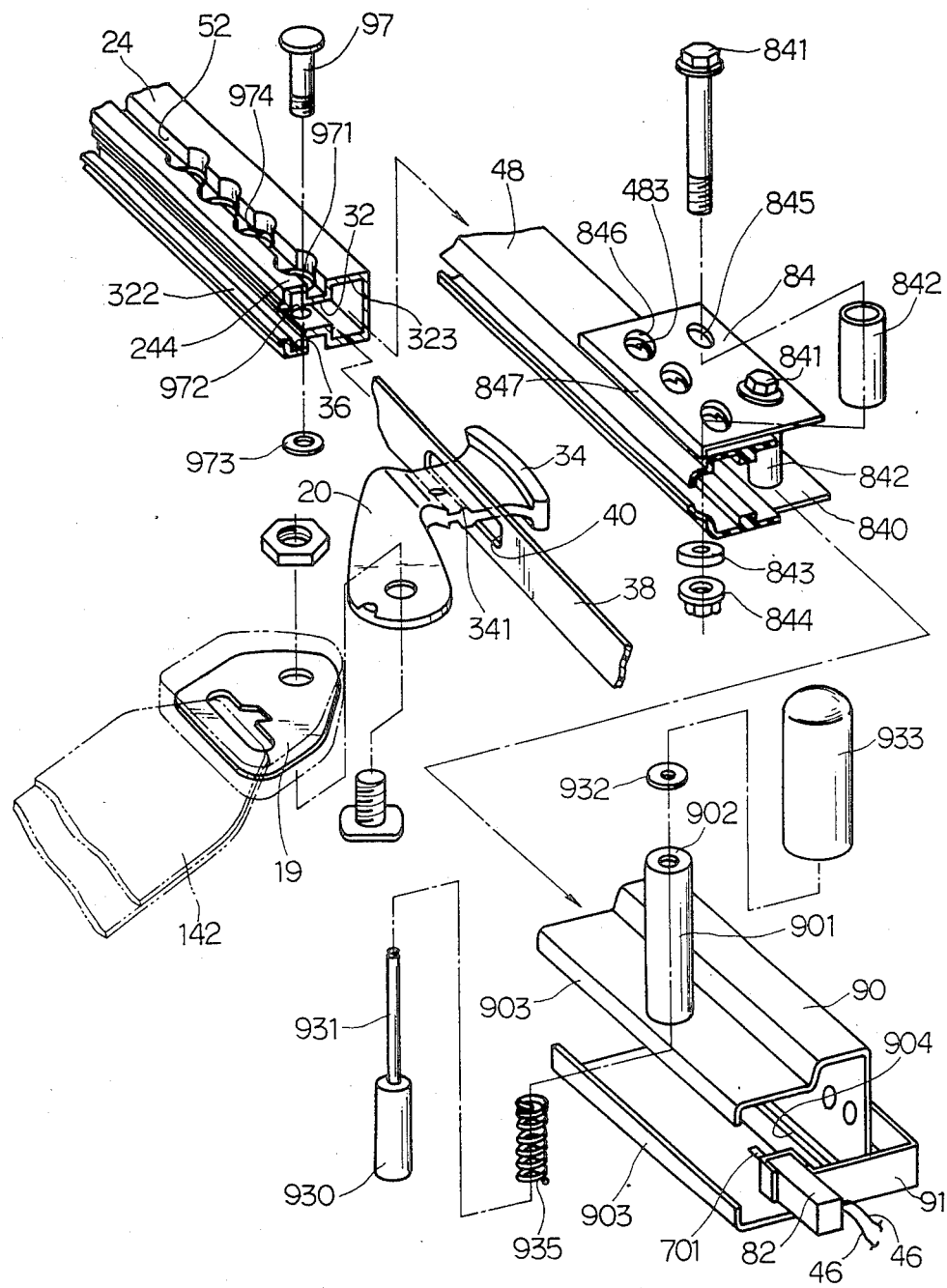
FIG. 7 is a perspective disassembled view the embodiment shown in FIG. 5.

The stop bar 930 may be displaced from an engagement position shown in FIG. 5 to a disengagement position shown in FIG. 6.

In FIG. 6, the stop bar 930 is located within the cylinder portion 901 and the spring 935 is compressed between the inner end of the cylinder portion 901 and the stop bar 930.

Accordingly, an operator may select one of the plurality of openings 974 of the guide rail 24 by moving the adjustment device 30 along the guide rail 24 to adjust an anchor position of the slider 20. As shown in FIG. 8, when the stop bar 930 is located in an uppermost first opening 974 and an uppermost recess 975 the anchor position of the slider 20 is at an uppermost stop position which is suitable for tall occupants. When the stop bar 930 is relocated in a lowermost first opening 974 and a lowermost recess 975, the anchor postion of the slider 20 is at a lowermost stop position which is suitable for short occupants. When the stop bar 930 is located in the uppermost first opening 974 and the uppermost recess 975 the slider 20 can be displaced upwardly along the guide rail 24 but the slider 20 cannot be displaced downwardly past the uppermost stop position.

The second openings 971 and 972 are defined at the rear bottom end 244 which is lower than the lowermost first opening 974 and the lowermost recess 245. An anchor pin 97 is inserted into the second openings 971 and 972 and secured to the guide rail 24 by a snap ring 973.

Accordingly, even when the stop bar 930 cannot prevent the slider 20 from moving downward, the anchor pin 97 can prevent the slider 20 from moving downward.

Furthermore, the adjusting device 90 and guide rail 24 are covered by a garnish plate 99, which includes an elongated opening 991 and a slit 992. The cylinder portion 901 is located within the elongated opening 991 and the lips 481 of the cover 48 and the leg portion 342 of the slider 20 are located within the slit 992. The cylinder portion 901 is displaced with the elongated opening 991 and the leg portion 342 of the slider 20 is displaced between the lips 481 of the cover 48 which are located within the slit 992. The garnish plate 99 is secured to the center pillar 30 by edgings 993.

A pair of opening covers 998 are secured around the elongated opening 991 of the garnish plate 99. When the cylinder portion 901 is inserted in the elongated opening 991, the cylinder portion 901 separates the pair of opening covers 998 from each other. The opening covers 998 improves in the aesthetic appearance of the center pillar 30.

FIGS. 9 through 14 disclose a second embodiment of a seatbelt assembly according to the present invention. Most of the components shown in FIG. 9 through 14 are similar to the components of the first embodiment disclosed in FIGS. 1 through 8. The differences between the first and second embodiments shall be discussed hereinafter.

A rearward end 244 of a guide rail 24 is fixed to a center pillar 30 of a vehicle body by first and second rearward anchor brackets 84 and 840. The first rearward anchor bracket 84 includes a plurality of first holes 845, a plurality of second holes 846 and a bent portion 847. The bent portion 847 extends perpendicularly from the first rearward anchor bracket 84 and is in contact with a bottom surface 249 of the guide rail 24. As shown clearly in FIG. 12, a lip 481 of a cover 48 is removed from a main portion of the cover 48 in the vicinity of the bent portion 847 and the main portion of the cover 48 is positioned between a inner surface 247 of the guide rail 24 and the first rearward anchor bracket 84. The rearward end 244 of the guide rail 24 includes only a pair of second openings 971 and 972.

The pair of second openings 971 and 972 are defined between a tape groove 36 and a head groove 323 of a guide groove 32 so as not to prevent a driving tape 38 and a rearward stop switch 82 from being displaced respectively within the tape groove 36 and the head groove 323.

A lip 481 of another cover 48 is also removed from a main portion of the other cover 48 in the vicinity of a bent portion 847 of the second rearward anchor bracket 840. The main portion of the other cover 48 is positioned between an outer side surface 248 of the guide rail 24 and the second rearward anchor bracket 840. The second rearward anchor bracket 840 includes a plurality of first holes 845 and a bent portion 847. The bent portion 847 extends perpendicularly from the second rearward anchor bracket 840 and the bent portion 847 is in contact with the bottom surface 249 of the guide rail 24.

A bolt 841 is inserted in the first holes 845 of the first and second rearward anchor brackets 84 and 840, a cylinder 842 and a spacer 843. The bolt 841 is secured to a inner plate 301 of the center pillar 30 by a nut 844.

Accordingly, the guide rail 24 is securely mounted on a center pillar 30 and an interval is defined between the inner plate 301 of the center pillar 30 and the second rearward anchor bracket 840 by the spacer 843.

Further, a stop plate 848 bridges the lower ends of the bent portions 847 of the first and second rearward anchor brackets 84 and 840.

When the first and second rearward anchor brackets 84 and 840 are assembled with the guide rail 24, the stop plate 848 extends in the lateral direction of the guide rail 24 and the stop plate 848 crosses a slit 322 of the guide rail 24.

An adjustment device 90 includes a cylinder portion 901, a pair of bent portions 903, an elongated opening 904, a stop bar 938 and a bracket 91. The adjustment device 90 is slidably mounted on the first and second rearward anchor brackets 84 and 840. The stop bar 938 extends in the lateral direction of the guide rail 24 and bridges the pair of bent portions 903. The stop bar 938 is located at substantially the center of the adjustment device 90 in the longitudinal direction thereof. An inner plate 905 covers a lower inner portion defined between the pair of bent portions 903 and the stop bar 938.

The lips 481 of the covers 48 are removed from the main portions of the covers 48 in the vicinity of the bent portions 847 of the first and second rearward anchor brackets 84 and 840, so that even when the adjustment device 90 is displaced along the guide rail 24, friction is not caused between the stop bar 938 and the lips 481 of the cover 48. Thus, the stop bar 938 is not prevented from being displaced along the guide rail 24.

Figure 10:
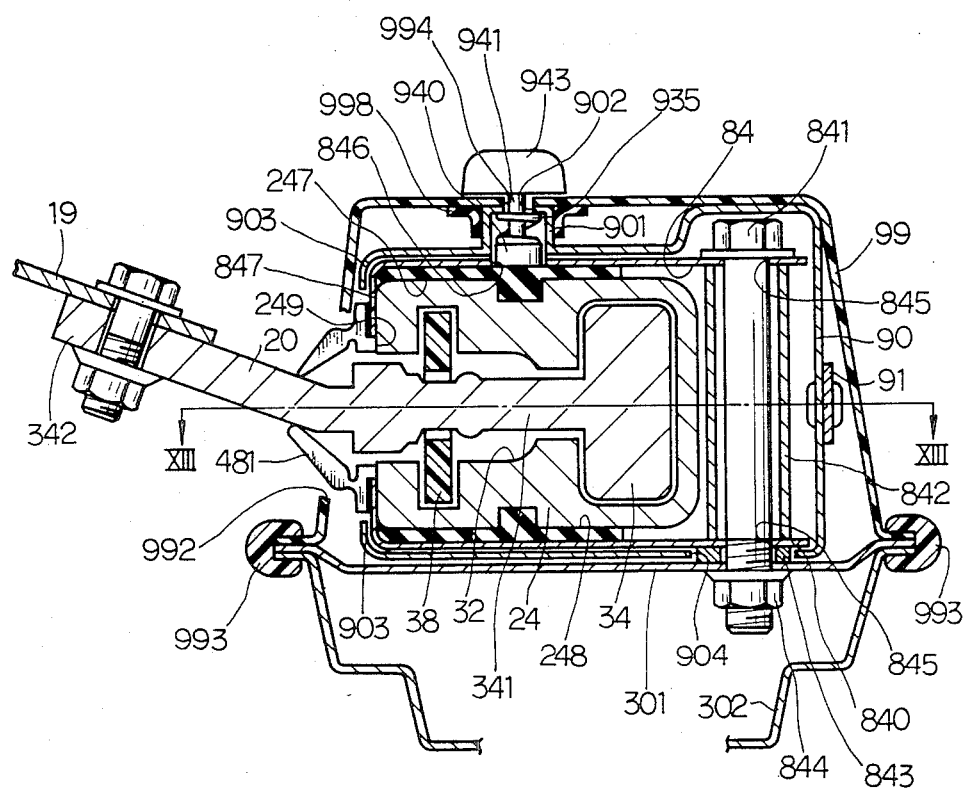
FIG. 10 is an enlarged cross-sectional view taken along the line X—X in FIG. 9, wherein an engagement means is positioned at an engagement position.

A connecting rod 941 is connected to a knob 943 and is inserted into a opening 902 of the cylinder portion 901. Further, the connecting rod 931 is inserted into a spring 935 and another end of the connecting rod 941 is secured to an engagement bar 940. As shown in FIG. 10, when the engagement bar 940 is biased by the spring 935, the engagement bar 940 is located in the second hole 846 and the cylinder portion 901.

Figure 13:
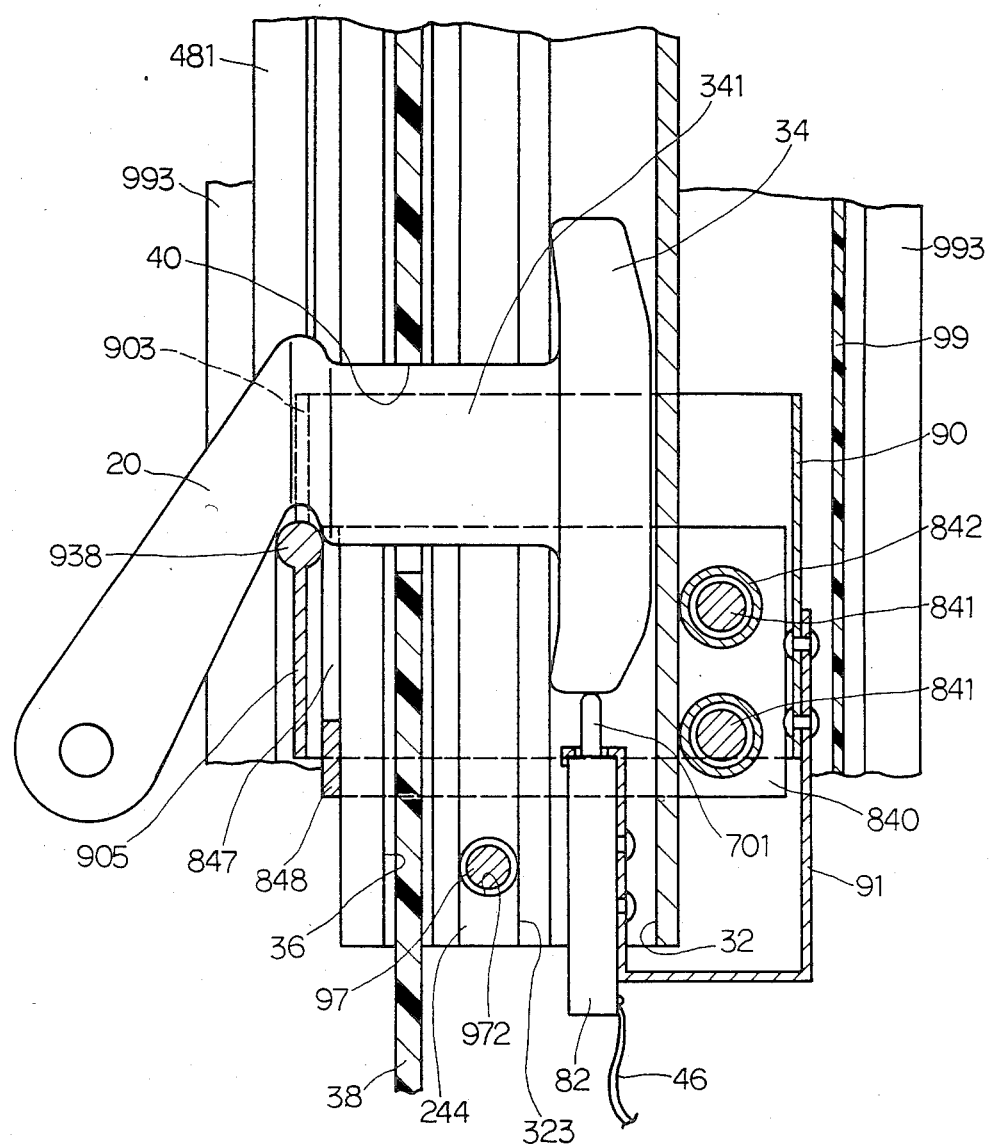
FIG. 13 is an enlarged cross-sectional view of taken along the line XIII—XIII in FIG. 10, wherein a stop means of the second embodiment is positioned at an uppermost stop position.

Accordingly, as shown in FIG. 13, the slider 20 is prevented from moving downwardly along the guide groove 32 by the stop bar 938 of the adjustment device 90, and concurrently, an end of the head portion 34 of the slider 20 contacts with an actuator 701 of the rearward stop switch 82.

Figure 11:
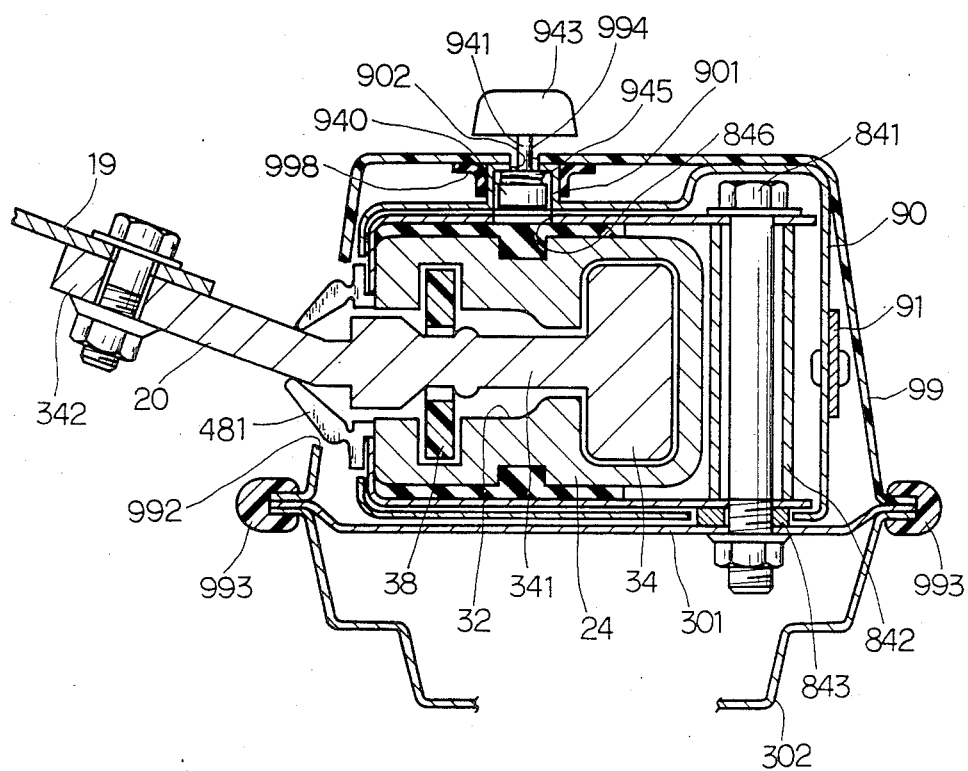
FIG. 11 is an enlarged cross-sectional view taken along the line X—X in FIG. 9, wherein the engagement means is positioned at a disengagement position.
Figure 12:
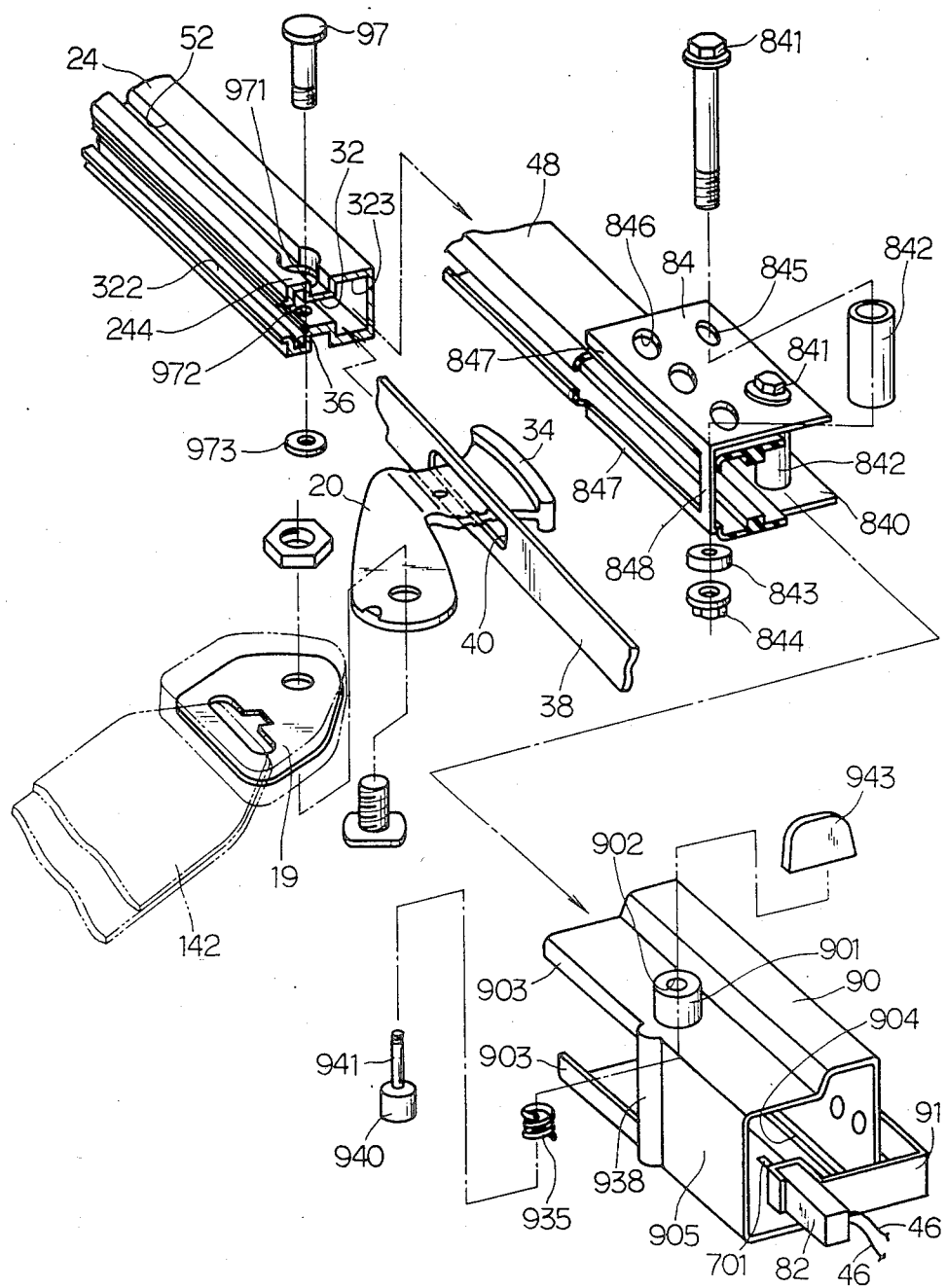
FIG. 12 is a perspective disassembled view of the second embodiment shown in FIG. 9.

Further, the engagement bar 940 may be displaced in the lateral direction of the guide rail 24 from an engagement position shown in FIG. 10 to a disengagement position shown in FIG. 11.

In FIG. 11, the engagement bar 940 is located within the cylinder portion 901 and the spring 935 is compressed between an inner end of the cylinder portion 901 and the engagement bar 940.

Figure 14:
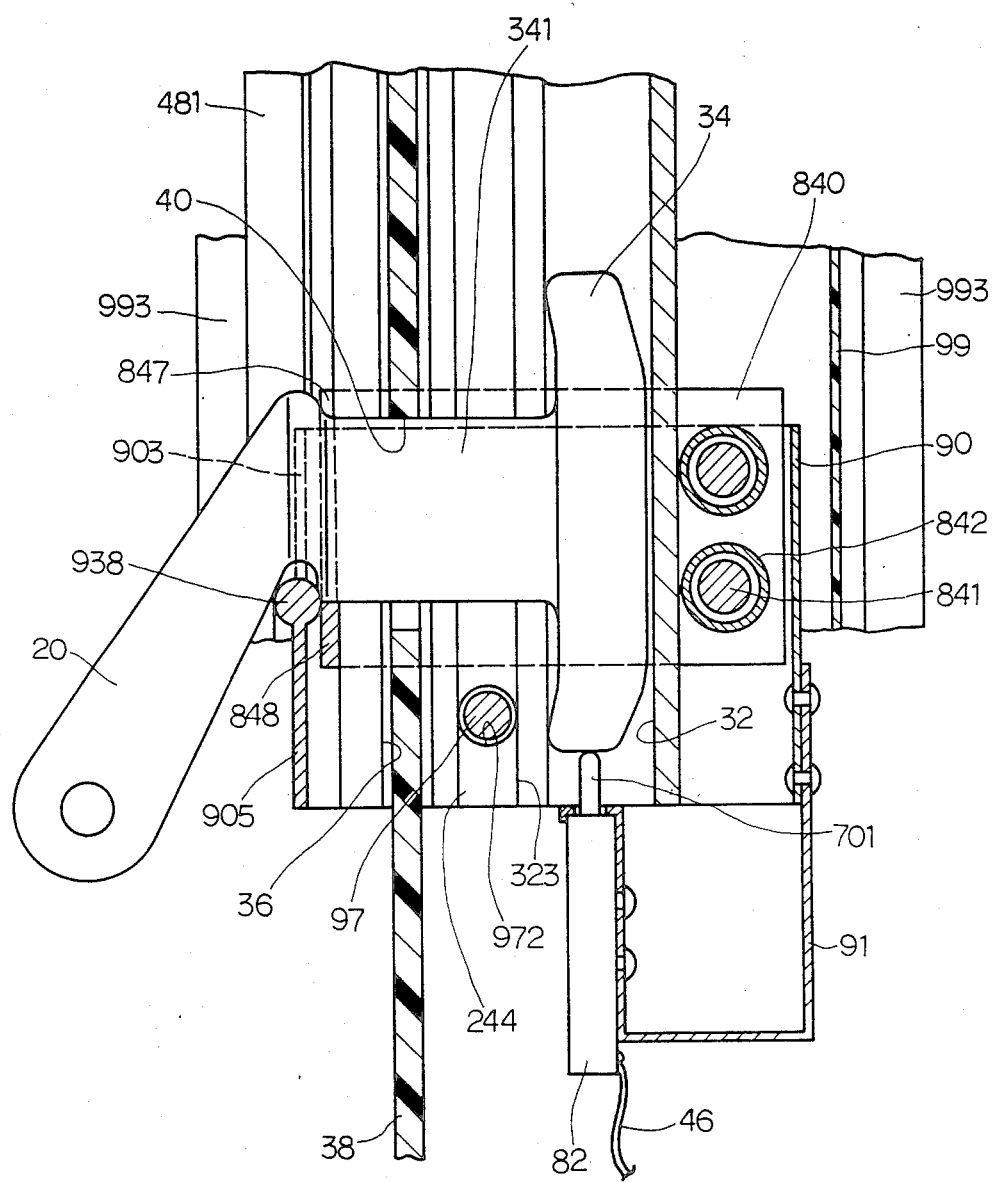
FIG. 14 is an enlarged cross-sectional view of taken along the line XIII—XIII in FIG. 10, wherein the stop means is positioned at a lowermost stop position.

Accordingly, an operator may select one of the plurality of second holes 846 by moving the adjustment device 90 along the guide rail 24 to adjust an anchor position of the slider 20. When the engagement bar 940 is located in an uppermost second hole 846, the stop bar 938 is positioned in an uppermost position as shown in FIG. 13 and the anchor position of the slider 20 is in an uppermost stop position which is suitable for tall occupants. When the engagement bar 940 is relocated in a lowermost second hole 846, the stop bar 938 is in a lowermost position as shown in FIG. 14 and the anchor postion of the slider 20 is positioned at a lowermost stop position which is suitable for short occupants. When the stop bar 938 is located at the lowermost stop position, the stop plate 848 is located in the vicinity of the stop bar 938 and the stop plate 848 also prevents the slider 20 from being displaced further downward. When the stop bar 938 is located in one of the stop positions the slider 20 can be displaced upwardly along the guide rail 24 but the slider 20 cannot be displaced downwardly past one of the stop positions.

The second openings 971 and 972 are defined at the rearward end 244 which is positioned lower than the lowermost second hole 846. An anchor pin 97 is inserted into the second openings 971 and 972 and is secured to the guide rail 24 by a snap ring 973.

Accordingly, even when the stop bar 938 and the stop plate 848 cannot prevent the slider 20 from moving downwardly, the anchor pin 97 can prevent the slider 20 from moving further downwardly.

Furthermore, the adjusting device 90 and the guide rail 24 are covered by a garnish plate 99, which includes a narrow elongated opening 994 and a slit 992. The connecting rod 941 is located within the elongated opening 994 and the connecting rod 941 is displaced within the elongated opening 994 along the guide rail 24.

Figure 15:
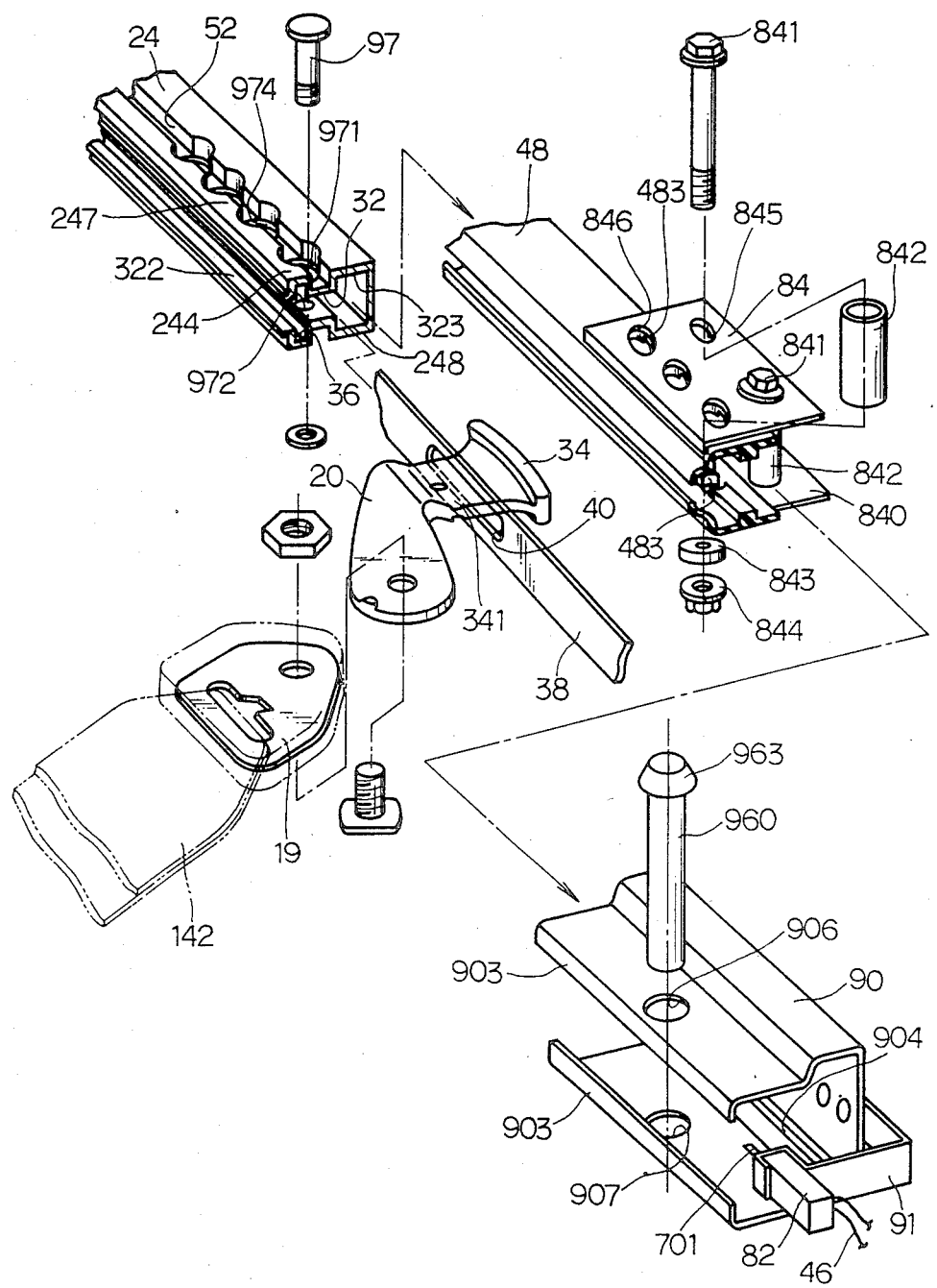
FIG. 15 is a perspective disassembled view of a third embodiment of the present invention.
Figure 16:
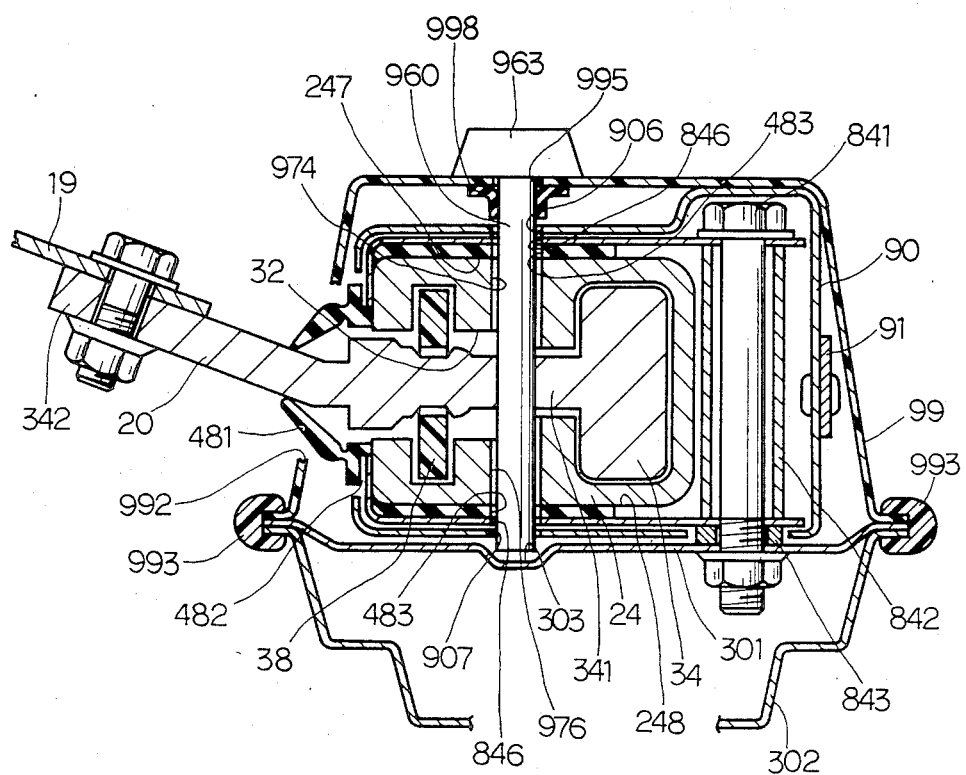
FIG. 16 is an enlarged cross-sectional view of the third embodiment taken along the line V—V in FIG. 1, wherein a stop means is positioned at an engagement position.
Figure 17:
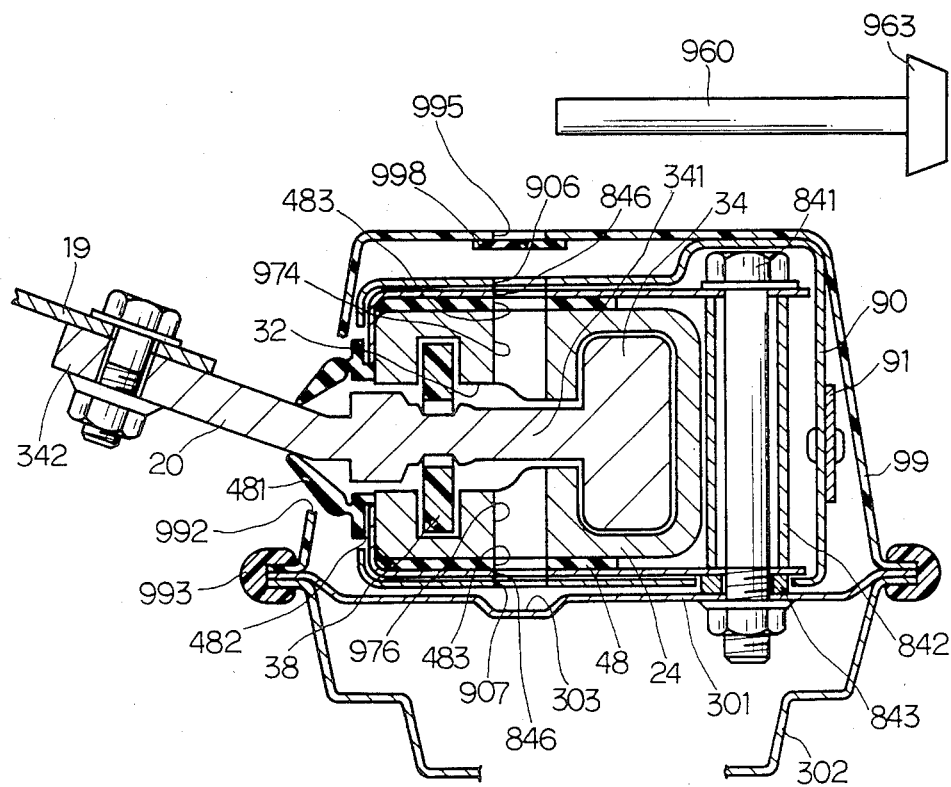
FIG. 17 is an enlarged cross-sectional view of the third embodiment taken along the line V—V in FIG. 1, wherein the stop means is positioned at a disengagement position.

FIGS. 15 through 17 disclose a third embodiment of a seatbelt assembly according to the present invention. The third embodiment is similar to the first embodiment disclosed above, wherein adjustment device 90, guide rail 24 and second rearward anchor plate 840 are modified.

A rearward end 244 of a guide rail 24 is fixed to a center pillar 30 of a vehicle body by first and second rearward anchor brackets 84 and 840. The first and second rearward anchor brackets 84 and 840 each include a respectively a plurality of first holes 845, a plurality of second holes 846 and a bent portion 847. A cover 48 is positioned between an inner surface 247 of the guide rail 24 and the first rearward anchor bracket 84. The other cover 48 is positioned between an outer side surface 248 of the guide rail 24 and the second rearward anchor bracket 840. The cover and the other cover 48 each include a a plurality of holes 483 and each hole 483 is the same size as each of the second hole 846 of the first and second rearward anchor bracket 84. Each hole 483 is coaxial with each second hole 846. The rearward end 244 of the guide rail 24 includes a plurality of first openings 974, a pair of second openings 971 and 972 and a plurality of third openings 976. The plurality of first openings 974 and the second opening 971 are defined between the inner side surface 247 of the guide rail 24 and a guide groove 32. The plurality of third openings 976 and the other second opening 972 are defined between the outer side surface 248 of the guide rail 24 and a guide groove 32. The plurality of first and third openings 974 and 976 are in alignment in the longitudinal direction of the guide rail 24. Each of the first and third openings 974 and 976 are coaxial with the corresponding holes 483 of the cover and other cover 48, and the corresponding second holes 846 of the first and second rearward anchor brackets 84 and 840. Each of the first and third opening 974 and 976 are the same size as the corresponding hole 483 and the corresponding second hole 846.

Accordingly, the guide groove 32 communicates with the outside of the first and second rearward anchor bracket 84 and 840 through the first opening 974, the hole 483 and the second hole 846 and through the third opening 975, the hole 483 and the second hole 846.

The plurality of first and third openings 974 and 976 and the pair of second openings 971 and 972 are defined between a tape groove 36 and a head groove 323 of the guide groove 32 so as not to prevent a driving tape 38 and the rearward stop switch 82 from moving within the tape groove 36 and the head groove 323, respectively.

A bolt 841 is inserted in a first hole 845 of the first and second rearward anchor brackets 84 and 840, a cylinder 842 and a spacer 843 and the bolt 841 is secured to an inner plate 301 of the center pillar 30 by a nut 844.

An adjustment device 90 includes a pair of apertures 906 and 907, a pair of bent portions 903, an elongated opening 904, a stop bar 960 and a bracket 91, and the adjustment device 90 is slidably mounted on the first and second rearward anchor brackets 84 and 840. The aperture 906 is defined withing an inner plate of the adjustment device 90 and the other aperture 907 is defined within an outer plate of the adjustment device 90. The aperture 906 is coaxial with, and the same size as, the aperture 907.

The stop bar 960 is connected to a knob 963. As shown in FIG. 15, the stop bar 960 may be inserted into the aperture 906, the second hole 846 of the first rearward anchor plate 84, the hole 483 of the cover 48, the first and third openings 974 and 976 of the guide rail 24, the hole 483 of the another cover 48, the second hole 846 of the second rearward anchor plate 840 and the other aperture 907. The stop bar 960 crosses the guide groove 32 of the guide rail 24 when it is inserted. An elongated recess 303 is defined within the inner plate 301 of the center pillar 30. The elongated recess 303 corresponds to the plurality of second holes 846 of the second rearward anchor plate 840 and extends in the vertical direction of the vehicle.

Accordingly, when the stop bar 960 crosses the guide groove 32, the slider 20 is prevented from moving downwardly along the guide rail 24. When the slider 20 is in contact with the stop bar 960, an end of a head portion 34 of the slider 20 is in contact with an actuator 701 of a rearward stop switch 82.

Further, the stop bar 960 may be displaced from an engagement position shown in FIG. 15 to a disengagement position shown in FIG. 16.

In FIG. 16, the stop bar 930 is shown removed from the adjustment device 90.

Accordingly, an operator may select one of the plurality of openings 974 of the guide rail 24 by moving the adjustment device 90 along the guide rail 24 to adjust an anchor position of the slider 20. When the stop bar 960 is located in uppermost first and third openings 974 and 976, the anchor position of the slider 20 is positioned at an uppermost stop position which is suitable for tall occupants. When the stop bar 960 is relocated to lowermost first and third openings 974 and 976, the anchor postion of the slider 20 is at a lowermost stop position which is suitable for short occupants. When the stop bar 960 is located in one pair of the first and third openings 974 and 976, the slider 20 can be displaced upwardly along the guide rail 24 but the slider 20 cannot de displaced downwardly over the one pair of first and third openings 974 and 976.

The second openings 971 and 972 are defined at the rear bottom end 24 which is lower than the lowermost first and third openings 974 and 976. An anchor pin 97 is inserted into the second openings 971 and 972 and the anchor pin 97 is secured to the guide rail 24 by a snap ring 973.

Accordingly, even when the stop bar 960 cannot prevent the slider 20 from moving downwardly, the anchor pin 97 can prevent the slider 20 from moving further downwardly.

Furthermore, the adjusting device 90 and the guide rail 24 are covered by a garnish plate 99, which includes an elongated opening 995 and a slit 992. The stop bar 960 may be located within the elongated opening 995 and the cylinder portion 901 is displaced within the adjustment device 90.

As described herein, the present invention overcomes the shortcomings of the known art by providing an adjustment means for adjusting an anchor position of a slider of a seatbelt assembly.

While, the present invention has been described in its preferred embodiments, it should be understood that it is not limited thereto, but may be otherwise embodied within the scope of the following claims.

What is claimed is:

1. A seatbelt assembly for automatically fastening a restraining webbing around an occupant in a vehicle, comprising:
    a guide rail having a longitudinal groove therein, said guide rail being mounted on a vehicle body, said guide rail having at least two first holes communicating with said longitudinal groove, the two first holes being aligned in a longitudinal direction of said guide rail;
    a slider being displaceable along the longitudinal groove of said guide rail, the restraining webbing being fastened at one end thereof to said slider; and
    an adjustment means having a stop member, said adjustment means being slidably mounted on said guide rail, said stop member being displaceable in the lateral direction of said guide rail, said stop member being selectively positioned so as to protrude in one of said at least two first holes, said slider being displaceable along said guide rail between a front end of said guide rail and the protruding stop member, whereby when the stop member protrudes within one of said at least two first holes the stop member prevents said slider from being displaced past said stop member.

2. The seatbelt assembly of claim 1, wherein said guide rail further comprises a rear vertical portion in which said at least two first holes are positioned, said at least two first holes being aligned in the vertical direction of the rear vertical portion of said guide rail, said first hole being located upward of said second hole.

3. The seatbelt assembly of claim 2, wherein the two first holes are opened in a rear bottom end of said guide rail and said slider is displaceable between the front end and the rear bottom end of said guide rail, so that when the stop member protrudes within the longitudinal groove of said guide rail the stop member prevents said slider from moving past said stop member.

4. The seatbelt assembly of claim 2, further comprising a holding means and a fixing means, the holding means having a hook portion and at least two openings, the hook portion supporting said guide rail thereon, the hook portion being secured to the vehicle body by the fixing means, the two openings corresponding with and being coaxial with said at least two first holes of said guide rail.

5. The seatbelt assembly of claim 4, further comprising a cover, the cover being located between the holding means and said guide rail, the cover having at least two openings and a lip, the two openings of the cover corresponding and being coaxial with the two openings of the holding means and the two first holes of said guide rail, the lip of the cover covering a slit of said guide rail.

6. The seatbelt assembly of claim 2, further comprising an anchor means, the anchor means crossing the longitudinal groove of said guide rail, the anchor means being secured to said guide rail, the anchor means being located lower than the second anchor position of said slider.

7. The seatbelt assembly of claim 1, wherein said adjustment means further comprises a holding member which is slidably mounted on the guide rail, the holding member having at least one aperture, the stop member being selectively inserted into said at least one aperture, whereby when at least one aperture of said adjustment means is coaxial with one of the at least two first holes, and when the stop member is positioned within both the aperture and one of said at least two first holes, said adjustment means is locked to said guide rail.

8. The seatbelt assembly of claim 7, wherein the stop member is detachable from the holding member of said adjustment means.

9. The seatbelt assembly of claim 7, wherein said adjustment means further comprises a bias means which is positioned between the stop member and the holding member, the bias means biasing the stop member to be inserted in one of said at least two first holes.

10. The seatbelt assembly of claim 7, further comprising a detecting means for detecting an arrival of said slider at one of the first and second anchor positions, the detecting means being mounted on the holding member, the detecting means being selectively located within the longitudinal groove of said guide rail in accordance with the position of said holding member, whereby when the stop member is located within an upper one of the two first holes of said guide rail the detecting means is positioned at a first position corresponding to a first anchor position of said slider, and when the stop member is located within a lower one of the two first holes of said guide rail the detecting means is positioned at a second position corresponding to a second anchor position of said slider.

11. The seatbelt assembly of claim 1, wherein said guide rail further comprises at least two recesses which are located opposite said at least two first holes within said guide rail, each of said at least two recesses being coaxial with one of said at least two first holes, said stop member being positioned within both one of said at least two first holes and one of said at least two recesses, whereby the stop member crosses the longitudinal groove of said guide rail.

12. The seatbelt assembly of claim 1, wherein said guide rail further comprises at least two second holes which are located opposite the two first holes within said guide rail, the two second holes being coaxial with the two first holes, said stop member being positioned within both one of said at least two first holes and one of said at least two second holes, whereby the stop member crosses the longitudinal groove of said guide rail.

13. A seatbelt assembly for automatically fastening a restraining webbing around an occupant in a vehicle, comprising:
a guide rail having a longitudinal groove, a slit, a front end and a rear bottom end;
a holding means having a hook portion and at least two openings, the hook portion holding said guide rail theron, said at least two openings being aligned in the longitudinal direction of said guide rail;
a fixing means securing said holding means to a vehicle body, whereby said guide rail is secured to the vehicle body by said holding means and said fixing means;
a slider being displaceable along the longitudinal groove between the front end and the rear bottom end of said guide rail, an end of said slider extending outside of said guide rail, the restraining webbing being fastened at one end thereof to the end of said slider; and
an adjustment means having an engagement means and a stop member, said adjustment means being slidably mounted on said holding means, said adjustment means surrounding said holding means and said guide rail, the engagement means being moveably in the lateral direction of said guide rail, the engagement means being slidably mounted on said adjustment meber, the engagement means being selectively positioned in one of said at least two openings of said holding means, the stop member extending to said adjustment means, the stop member being located in the lateral direction of said guide rail and crossing the slit of said guide rail, whereby when the engagement means is positioned within one of the two openings of said holdings means the engagement member prevents said adjustment means from being displaced along said guide rail and the stop member along the longitudinal groove of said guide rail, whereby when the engagement means is positioned within a first one of said at least two openings of said holding means said stop member is in a first anchor position, and when said engagement means is positioned within a second one of said at least two openings of said holding means said stop member is in a second anchor position and whereby said adjustment means prevents said holding means from loosening said guide rail.

14. The seatbelt assembly of claim 13, wherein said guide rail further comprises a rear vertical portion, said holding means holding the rear vertical portion of said guide rail, whereby the two openings of said holding means are aligned in the vertical direction of the rear vertical portion of said guide rail and the first anchor position is located above said second anchor position.

15. The seatbelt assembly of claim 14, wherein said holding means further comprises a bridge member, the bridge member extending in the lateral direction of said guide rail, the bridge member crossing the slit of said guide rail, the bridge member being located near the rear bottom end of said guide rail, whereby when the engagement member is positioned in a lower one of said two openings of said holding means said bridge member of said holding means prevents said slider from moving downwardly.

16. The seatbelt assembly of claim 15, wherein said adjustment means further comprises a bias means, the bias means being located between the engagement member and said adjustment means, the engagement member being slidably mounted on said adjustment means, the bias means biasing the engagement member to be positioned in one of said at least two openings of said holding means.

17. The seatbelt assembly of claim 16, further comprising a detecting means for detecting an arrival of said slider at one of the first and second anchor positions, the detecting means being mounted on said adjustment means, the detecting means being selectively located within the longitudinal groove of said guide rail in accordance with the position of the adjustment means, whereby when the engagement means is located within an upper one of said at least two openings of said holding means the detecting means is positioned at a first position corresponding to said first anchor position of said slider, and when the engagement means is located within a lower one of said at least two openings of said holding means the detecting means is positioned at a second position corresponding to said second anchor position of said slider.

18. The seatbelt assembly of claim 15, further comprising a cover, the cover having a first portion and second portion, the second portion of the cover being located above the first portion of the cover in the vertical direction of said slider, the first portion of the cover being located between the holding means and said guide rail, the second portion of the cover having a lip.

19. The seatbelt assembly of claim 15, further comprising an anchor means, the anchor means crossing the longitudinal groove of said guide rail, the anchor means being secured to said guide rail, the anchor means being located lower than the second anchor position of said slider.

20. A seatbelt assembly for automatically fastening a restraining webbing around an occupant in a vehicle, comprising:
a guide rail having a longitudinal groove, a slit, a front end, a rear bottom end and at least two openings, said at least two openings being aligned in the longitudinal direction of said guide rail, said guide rail being secured to a vehicle body;
a slider being displaceable along the longitudinal groove between the front end and the rear bottom end of said guide rail, an end of said slider extending outside of said guide rail, the restraining webbing being fastened at one end thereof to the end of said slider; and
an adjustment means having an engagement means and a stop member, said adjustment means being slidably mounted on said guide rail, the engagement means being moveable in the lateral direction of said guide rail, the engagement means being slidably mounted on said adjustment member, the engagement means being selectively positioned in one of said at least two openings of said guide rail, the stop member extending to said adjustment means, the stop member being located in the lateral direction of said guide rail and crossing the slit of said guide rail, whereby when the engagement means is positioned within one of the two openings of said guide rail the engagement member prevents said adjustment means from being displaced along said guide rail and the stop member prevents said slider from being displaced past the stop member along the longitudinal groove of said guide rail and whereby when the engagement means is positioned within a first one of said at least two openings of said guide rail said stop member is in a first anchor position, and when said engagement means is positioned within a second one of said at least two openings of said guide rail said stop member is in a second anchor position.

* * * * *